United States Patent [19]

Roberts

[11] Patent Number: 4,555,001

[45] Date of Patent: Nov. 26, 1985

[54] OVERTRAVEL DEVICE FOR AN AUTOMATIC BRAKE ADJUSTER

[75] Inventor: James K. Roberts, South Bend, Ind.

[73] Assignee: Allied Corporation, Morristown, N.J.

[21] Appl. No.: 562,127

[22] Filed: Dec. 16, 1983

[51] Int. Cl.[4] .............................................. F16D 65/56
[52] U.S. Cl. ..................... 188/79.5 GE; 188/196 BA;
188/331; 267/74; 267/179
[58] Field of Search ............... 188/325, 326, 327, 328,
188/329, 330, 331, 332, 333, 334, 340, 79.5 GE,
79.5 GC, 196 BA, 196 B; 267/73, 74, 69, 169,
174, 176, 178, 179

[56] References Cited

U.S. PATENT DOCUMENTS

| | | | |
|---|---|---|---|
| 1,250,500 | 12/1917 | Pippe | 294/99.2 |
| 1,577,698 | 3/1926 | Eberle | 267/74 |
| 3,216,533 | 11/1965 | Hagerty et al. | 188/196 BA |
| 3,460,653 | 8/1969 | Wieger | 188/196 BA |

Primary Examiner—Bruce H. Stoner, Jr.
Assistant Examiner—Alvin Oberley
Attorney, Agent, or Firm—Larry J. Palguta; Ken C. Decker

[57] ABSTRACT

A continuous wireform is constructed as the cage (48) for a caged spring (50), these two components serving as the overtravel arrangement in an automatic brake adjuster. The wireform cage has a coil (70) formed at one end of the cage (48) and two limbs (72, 74) extend from the coil (70) and terminate in open ended complementary hook sections (86, 88) which are superimposed when the limbs (72, 74) are yieldably drawn together. A stretched coil spring (50) is then hooked to the integral coil (70) of the wireform and at the other end to the complementary hook sections (86, 88).

9 Claims, 6 Drawing Figures

OVERTRAVEL DEVICE FOR AN AUTOMATIC BRAKE ADJUSTER

This invention relates to an improved overtravel device usable in combination with an automatic brake adjuster.

The present invention is utilized with a vehicle brake comprising a torque plate and a pair of servo applied brake shoes consisting of a primary shoe and a secondary brake shoe. A threaded elongatable adjuster link connects one adjacent pair of ends of the primary and secondary shoes and the other pair of adjacent ends of the primary and secondary shoes are operated by a wheel cylinder. A serrated turnable wheel effects elongation of the threaded adjuster link and thereby adjusting the primary and secondary shoes. Means for operating the serrated wheel responsively to secondary shoe movement during reverse vehicle braking, consists of a pivoted adjuster lever engageable with successive serrations of the turnable wheel, thereby adjustably rotating this serrated wheel. A yieldable spring means acts on the lever to effect restoring force thereon, and a combination spring-and-spring-cage acts on the serrated turnable wheel to rotate the wheel in an adjusting direction and also to compensate for overtravel of the secondary brake shoe.

The prior art discloses an automatic brake adjuster incorporating a provision for overtravel of the shoes. An illustration of this is Hagerty, et al., U.S. Pat. No. 3,216,533 "Brake Adjuster with Overtravel Feature" issued Nov. 9, 1965 which illustrates the usage of a caged spring with the adjusting effort exerted by a cable attached to an anchor at one end and to the cage of the caged spring at the other end, with an intermediate wrapover connection with the secondary shoe. When the brake shoes are expanded, the caged spring will communicate cable tension as an operating force on a serrated adjustable wheel. Should the automatic adjuster connecting the shoes be incapable of being operated because the serrated wheel is locked, continued shoe movement will cause the cage to travel against the resistance of the caged spring. This overtravel provision precludes breakage of the automatic adjuster mechanism.

Helvern, U.S. Pat. No. 3,114,438 "Automatic Brake Adjuster" issued Dec. 17, 1963 discloses relief means for an automatic adjuster in the form of a bushing with a lost motion connection which permits overtravel of the shoes when the adjusting mechanism is locked or excessively difficult to operate In Weiger, U.S. Pat. No. 3,460,653 "Brake Adjuster" issued Aug. 12, 1969, overstressing of the automatic brake adjuster operating mechanism is avoided by floatably mounting the lever 42 which can slide in a shoe opening to relieve forces on the operating mechanism.

Bauman, et al., U.S. Pat. No. 3,357,527 issued Dec. 12, 1967 incorporates a protective overtravel mechanism by means of a third lever which is resiliently mounted and allows for variable positioning of the adjustable levers.

Dombeck, et al., U.S. Pat. No. 3,213,970 "Automatic Adjuster" issued Oct. 26, 1956 provides for overtravel in the automatic adjuster by means Of a lever floatable against the force of an overtravel spring.

The problem to be overcome by the present invention is to reduce the cost in construction, reduce the number of parts, and simplify the operation of automatic brake adjuster mechanisms incorporating provisions for overtravel. Specifically, the approach to solving the problem of achieving a practical and inexpensive automatic brake adjuster with overtravel, is the utilization of a novel wireform cage for a caged spring which forms part of the operating mechanism for the brake adjuster apparatus and further incorporates provision for overtravel of the brake shoes. The efficient use of materials of construction for forming the cage is an essential ingredient to economic production of the device. It is not uncommon in the prior art to achieve only a 46% utilization rate of the materials of construction and it is the purpose of the present invention to produce a wireform cage in which waste of construction material is either greatly reduced or wholly prevented.

The improved overtravel device is characterized in that the cage is constructed of a continuous wireform having two diverging limb sections with an integrally related coil joining the ends of the limbs to permit the limbs to be yieldably drawn together. The ends of the limbs form complementary open hook sections which become superimposed when the limbs are drawn together against the resistance of the integrally related coil. A coil spring is then stretched between the complementary hook ends of the caged limbs and the coil. The stretched coil spring is thus caged by the wireform limbs. The stretched spring is then operatively hooked to the torque plate and both the cage and caged spring are connected at their opposite ends to an adjuster lever to effect a rotation of the adjuster lever responsively to secondary shoe movement and thereby adjusting the brake shoes. Should the brake shoes continue to move while the adjuster lever and its associated adjusting mechanism is "locked" against further operation, the cage will be moved by the adjuster lever against the resistance of the coil spring to permit the necessary overtravel of the secondary shoe. An important advantage resulting from the invention is that the wireform cage is easily constructable, and entails no waste of material of construction. It is moreover readily variable in shape and size to accommodate different size and rate of caged coil spring and the assembly is easily installed into the brake system. The structure so described has an efficiency of size and volume so as not to interfere with other portions of the brake mechanism. Another distinct advantage of the present invention is that the device is lightweight and has a high strength to weight ratio so as not to contribute materially to overall brake weight.

The invention will not be described with reference to the accompanying drawings, wherein.

Figure 1:
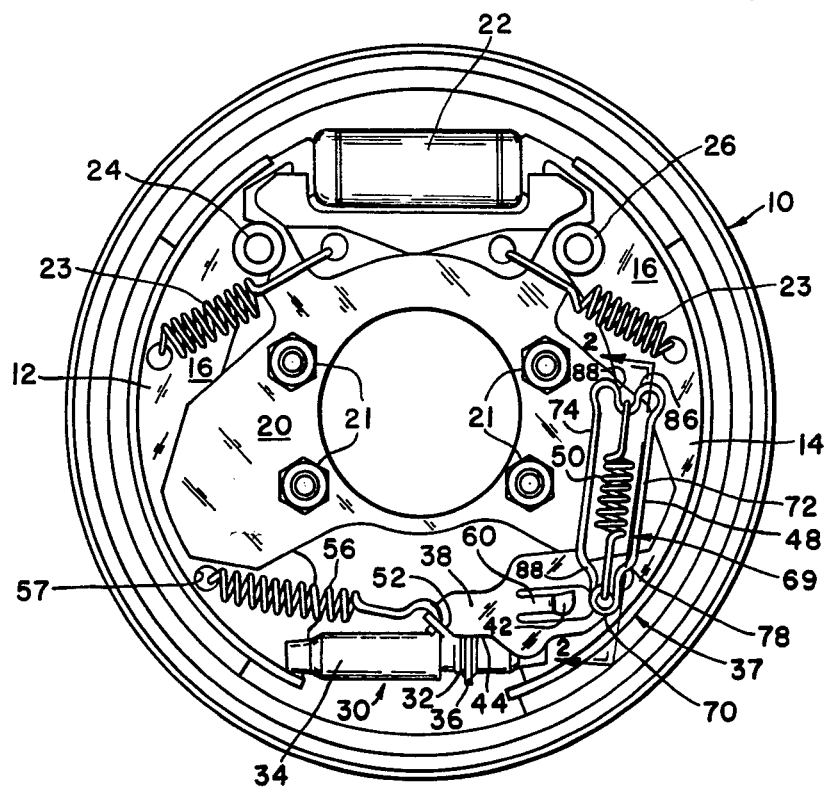
FIG. 1 is an elevation view of a brake incorporating the present invention therein.
Figure 2:
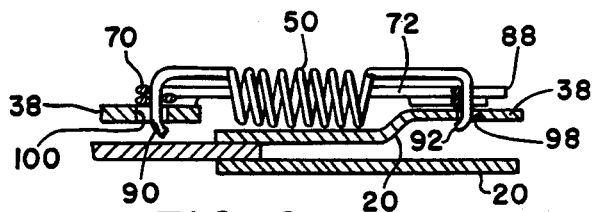
FIG. 2 is a section view taken on Line 2—2 of FIG. 1.

The invention is illustrated in use with a vehicle brake designated generally by reference numeral 10 having a primary shoe 12 and a secondary shoe 14 with the webs 16 of the shoes held between two torque plates 20, 20 secured by bolts 21 to the vehicle undercarriage. One adjacent pair of the shoe ends is actuated by a wheel cylinder 22 against the resistance of return springs 23, and the shoes are anchored on one or the other of the anchors 24 or 26 depending upon the direction of drum (not shown) rotation. When the drum rotates counterclockwise caused by vehicle forward movement, the two brake shoes anchor on anchor 26. In reverse vehicle movement the drum rotates clockwise and the two shoes anchor as a unit on anchor 24.

The other pair of adjacent shoe ends is connected by means of a strut 30 which is elongated by rotating the threaded stem 32 within the interior threaded opening of sleeve 34 by means of a serrated wheel 36. Serrated wheel rotation is effected by means of an automatic brake adjuster 37 including an adjuster lever 38 pivoted through a struck portion 40 which extends through an opening 42 in web 16 of the secondary shoe 14. Edge 44 of the adjuster lever 38 engages successive serrated teeth of wheel 36 to rotate the wheel during reverse vehicle rotation. The described lever 38 rotation is effected by means of combination cage 48 and caged coil spring 50. Adjuster lever return spring 56 which is hooked into and stretched between an upturned flange 52 of the adjuster lever 38 and opening 57 in the web 16 of the primary shoe 12 restores the adjuster lever 38 to its initial position following each adjusting operation and after the pressure in the wheel cylinder 22 is released. The anchored ends of the primary and secondary shoes are normally held against anchors 24 and 26 by return springs 23, 23.

Figure 3:
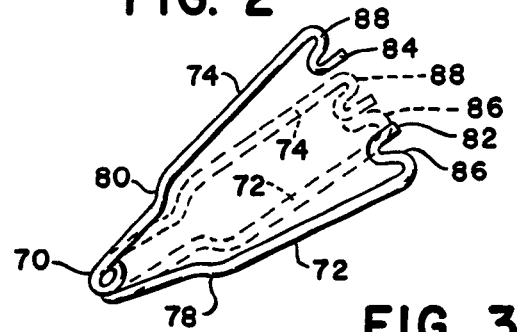
FIG. 3 is an enlarged isometric detail view of the wireform cage construction shown expanded in full line and in dotted view illustrates the compressed condition of the cage.
Figure 6:
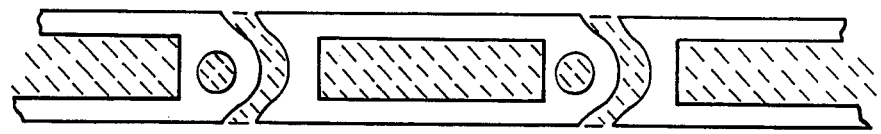
Figure 4:
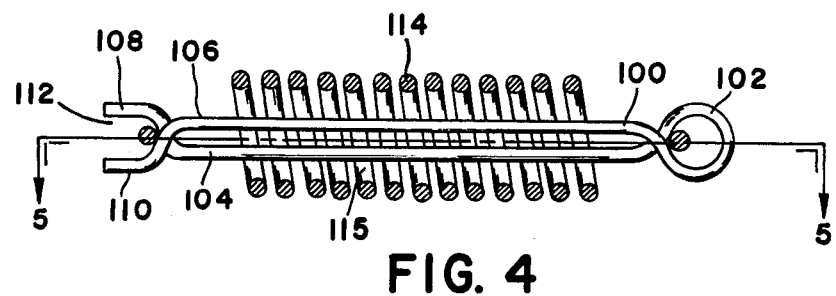
FIG. 4 illustrates a second embodiment of the invention in which the section view is taken logitudinally through the wireform cage and caged coil spring.
Figure 5:
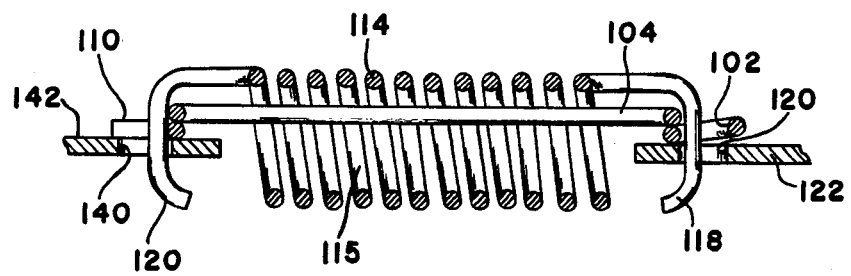
FIG. 5 is a sectional illustration of the embodiment illustrated in FIG. 4 and looking in the direction of the arrows 5—5 in FIG. 4; and, FIG. 6 is an illustration of prior art cage in which the waste of construction material is illustrated and obviated by the present invention.

The cage 48 and spring 50 serve as an overtravel device 69 and in one embodiment consist of a cage 48 constructed from continuous wireform with an integral coil 70 and two limbs 72 and 74 which are slightly divergent as indicated in FIG. 3. The limbs 72, 74 are stepped apart at 78 and 80 and the projected ends 82 and 84 of the limbs have reversely bent hook complementary sections 86 and 88 which overlie each other when the two limbs are drawn together against the yieldable resistance of the coil 70. (Dotted position FIG. 3). The two hook sections 86, 88 when superimposed, form an open ended hook and there is received therein one end 92 of a stretched coil spring 50, with the other end 90 of the stretched coil spring 50 passed through coil 70. The caged spring 50 thru maintains the ends 82 and 84 and the superimposed sections 86, 88 in the position illustrated in FIG. 1. Since the two ends of the stretched coil springs 50 are retained within the cage, coil spring 50 will be maintained under spring tension. The end 90 of the caged and stretched coil spring 50 is passed through an opening 100 of the lever 38 and the other end 92 of the coil spring is passed through an opening 98 of the torque plate 20.

During brake application with the vehicle moving in reverse to produce clockwise movement of the drum, shoe 14 will move outwardly toward the drum by the wheel cylinder 22. The caged spring 50 is held by the torque plate 20, and is further attached to the adjuster lever 38. Movement of shoe 14 will cause the adjuster lever 38 to rotate counterclockwise about its pivoted portion 40 received through opening 42 in the web of the secondary shoe thus causing rotation of the serrated wheel 36 through adjuster lever edge 44 in contact with the serrated wheel.

The braking force communicated from the secondary shoe 14 to the primary shoe 12 through the adjuster, will develop substantial resistance to rotation of the wheel 36 because elongation of the adjuster is in opposition to the large braking force transmitted between the secondary shoe and the primary shoe. Under these circumstances, when the adjuster lever 38 is impeded from rotating about 42 because the serrated wheel 36 opposes such rotation of the adjuster lever, normal movement of the secondary shoe does not impose breakage force on the adjuster components because the cage 48 is moved against the resistance of the prestretched coil spring 50. That is, the open hook sections 86, 88 will move away from the opening 98 in the torque plate 20 and the caged spring 50 is further stretched by the overtravel permitted the secondary shoe. This overtravel relieves what would otherwise be destructive force on the automatic adjuster thereby precluding damage to the automatic adjuster.

In a further embodiment of the invention, the wireform cage 101 includes integral coil 102 but the two limbs 104 and 106 are constructed sufficiently closely together so that when the reversely bent complementary ends 108 and 110 are superimposed to form open hook 112, the limbs are proportioned to fit through the interior diameter of a stack of stretched spring coils 114. The stretched spring 115 is held at one end 118 in coil 102 of the cage and the other end 120 is fastened within the open ended hook section formed by the reversely bent superimposed ends 108, 110. End 118 of the caged spring is passed through an opening 120 of adjuster lever 122 and end 122 of the caged spring passes through an opening 140 in the torque plate 142.

Operation of the embodiment is the same as in the previous embodiment.

The cage and caged spring is particularly advantageous in that it utilizes virtually all of the material of construction and waste is reduced to virtually nil in the method of fabrication. Manufacturing the device is inherently a low-waste operation and is readily susceptible to different design, size and shape overtravel devices to accommodate for different brakes and brake component arrangements, while not contributing greatly to the weight of the brake or interfering with other components of the brake. Forming the cage from wire produces a construction which is inherently more economical to produce and install.

The invention is usable with vehicle brakes including, but not limited to, those used in passenger cars, trucks, tractors and the like.

Although the present invention has been illustrated and described in connection with selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims.

I claim:

1. An improved overtravel device with an automatic brake adjuster apparatus comprising:
   a torque plate, a primary brake shoe and a secondary brake shoe, a threaded elongatable adjuster link connecting one adjacent pair of ends of said primary and secondary shoes to effect their adjustment, a serrated turnable wheel effecting elongation of said adjuster link to said shoes, means for operating said serrated wheel responsive to secondary shoe movement during reverse vehicle braking and consisting of a pivoted adjuster lever engageable with successive wheel teeth for adjustably rotating said wheel, yieldable spring means acting on said lever to effect restoring force thereon, and a combination spring and spring-cage overtravel device connected between said torque plate and lever characterized in that:

said cage is constructed of a continuous wireform having two diverging limbs, an integrally related coil joining the ends of the limbs to permit the limbs to be yieldably drawn together, and means forming open hook ends at projecting ends of the limbs, and which are superimposed against the force of the integrally related coil, and a coil spring stretched between the open hook ends of the limbs and the integrally related coil to become caged by the limbs, said stretched spring being operatively hooked to said torque plate and to an apertured end of said adjuster lever to effect its rotation responsively to secondary shoe movement and wherein said is moved against the resistance of the stretched coil spring during overtravel of said secondary shoe.

2. The overtravel device in accordance with claim 1 in which the limbs are stepped apart to increase the spacing therebetween and with such spacing proportioned relatively to the coil spring to receive the stretched coil spring within said spacing.

3. The overtravel device in accordance with claim 1 in which the limbs are closely spaced together and proportioned to enable the limbs to pass through the interior diameter of stacked coils of said coil spring.

4. The overtravel device in accordance with claim 1 wherein the means forming the open hook ends of the diverging ends of the limbs are each constructed as reversely bent sections, said sections being superimposed to form an open ended hook when the limbs are drawn together to complete the cage formation.

5. A combination spring and spring cage comprising a continuous wireform construction including a cantilever spring section constructed integrally from the wireform at one end of the cage, two normally diverging limbs of the wireform projecting from the, camtilavered spring section, said limbs terminating in complementary hook sections brought into superimposed relation when the limbs are biased together against the resistance of the integral spring section, and thereby to form an open-ended hook construction, and an elongatable spring stretched between and fastened to the open-ended hook construction and said integral cantilever spring section, respectively.

6. The spring cage in accordance with claim 5 wherein the spacing between the limbs in their drawn-together operative position is proportioned to receive the elongatable spring therein.

7. The spring cage in accordance with claim 5 wherein the limbs in their drawn-together operative position are proportioned to pass through an interior stack of coils of said elongatable spring which is in the form of a series of helically wound spring coils.

8. The spring cage in accordance with claim 5 wherein the stretched elongatable spring includes a hook end received within the complementary hook sections while they are in superimposed relation, to fix said complementary hook sections together and retain the limbs of the wireform in their biased together position.

9. A process for producing an overtravel device for an automatic brake adjuster comprising the steps of:

forming a coil section at mid-length of a continuous wireform and with terminations of the coil integrally related, one to each of two elongated and diverging limb sections, and reversely bending the ends of the limb sections to produce open-ended hook sections, biasing the limbs together to bring the reversely bent hook sections into superimposed complementary relation and, thereafter stretching a coil spring to the approximate length of said limbs and then hooking respective ends of the stretched coil spring into the coil section of the wireform and superimposed hook sections to hold simultaneously the open-ended hook sections in superimposed position and retain the stretched coil spring in caged relation with the limbs.

* * * * *